(12) United States Patent
Press

(10) Patent No.: US 9,460,149 B2
(45) Date of Patent: *Oct. 4, 2016

(54) DYNAMIC QUERY RESOLUTION USING ACCURACY PROFILES

(71) Applicant: MICROSOFT TECHNOLOGY LICENSING, LLC, Redmond, WA (US)

(72) Inventor: James Michael Press, Berkshire (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,458

(22) Filed: Dec. 22, 2015

(65) Prior Publication Data

US 2016/0110411 A1 Apr. 21, 2016

Related U.S. Application Data

(63) Continuation of application No. 13/917,424, filed on Jun. 13, 2013, now Pat. No. 9,223,872.

(51) Int. Cl.
*G06F 17/30* (2006.01)

(52) U.S. Cl.
CPC ..... *G06F 17/30401* (2013.01); *G06F 17/3064* (2013.01); *G06F 17/30528* (2013.01); *G06F 17/30864* (2013.01); *G06F 17/30867* (2013.01); *G06F 17/30657* (2013.01)

(58) Field of Classification Search
CPC .................... G06F 17/30864; G06F 17/3064; G06F 17/30657
See application file for complete search history.

(56) References Cited

U.S. PATENT DOCUMENTS

| | | |
|---|---|---|
| 7,296,019 B1 | 11/2007 | Chandrasekar et al. |
| 7,647,312 B2 | 1/2010 | Dai |
| 7,984,004 B2 | 7/2011 | Andrew et al. |
| 8,027,964 B2 | 9/2011 | Boulis et al. |
| 8,051,374 B1 | 11/2011 | Shazeer |
| 8,065,316 B1 | 11/2011 | Baker et al. |
| 8,190,627 B2 | 5/2012 | Platt et al. |

(Continued)

OTHER PUBLICATIONS

Cucerzan, et al., "Spelling Correction as an Iterative Process that Exploits the Collective Knowledge of Web Users", In Proceedings of the Conference on Empirical Methods in Processing, Jan. 1, 2004, pp. 293-300.

(Continued)

*Primary Examiner* — Cheryl Lewis
(74) *Attorney, Agent, or Firm* — Dave Ream; Doug Barker; Micky Minhas

(57) ABSTRACT

In various embodiments, methods and systems for dynamic validation of selectable data are provided. This may be accomplished by referencing search engine session data of a user. The search engine session data includes a plurality of search queries each having an entered-attribute and a resolved-attribute. A variation between the entered-attribute and the resolved-attribute, for each of the plurality of search queries, is determined based on analyzing the entered-attribute and the resolved-attribute. The entered-attribute is an input of the user and the resolved-attribute is a resolved-input for executing the search query. An input-precision score is generated for the user based on the variation between the entered-attribute and the resolved-attribute, for each of the plurality of search queries.

20 Claims, 6 Drawing Sheets

(56) References Cited

U.S. PATENT DOCUMENTS

| | | | |
|---|---|---|---|
| 8,370,329 B2 | 2/2013 | Gutt et al. | |
| 8,412,699 B1* | 4/2013 | Mukherjee | G06F 17/30395 707/713 |
| 8,583,672 B1* | 11/2013 | Paskin | G06F 17/3064 707/765 |
| 8,782,071 B1* | 7/2014 | Mukherjee | G06F 17/30867 707/759 |
| 9,223,872 B2* | 12/2015 | Press | G06F 17/30864 |
| 2006/0064411 A1* | 3/2006 | Gross | G06F 17/30864 |
| 2008/0046405 A1 | 2/2008 | Olds et al. | |
| 2013/0066896 A1* | 3/2013 | Mehanna | G06F 17/30395 707/767 |
| 2013/0124492 A1 | 5/2013 | Gao et al. | |

OTHER PUBLICATIONS

Limbu, et al., "Contextual and Conceptual based Interactive Query Expansion", In Proceedings of the 19th Annual Conference of the National Advisory Committee on Computing Qualification, Jul. 7, 2006, 5 pages.

* cited by examiner

DYNAMIC QUERY RESOLUTION USING ACCURACY PROFILES

CROSS-REFERENCE TO RELATED APPLICATIONS

This application is a continuation of, and claims priority to, U.S. patent application Ser. No. 13/917,424, filed Jun. 13, 2013, now U.S. Pat. No. 9,223,872, entitled "DYNAMIC QUERY RESOLUTION USING ACCURACY PROFILES," which is incorporated herein by reference in its entirety.

BACKGROUND

Users utilize various types of search engines for identifying relevant resources for search queries. Search engines receive search queries as user input and make meaning of the user input to provide the relevant resources. However, the accuracy with which users enter search queries varies from user to user. In addition, the input accuracy of a user may also be handicapped by the hardware and/or software input system used. Search engines today fail to account for user input accuracy in providing search functionality to different types of users.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method and system generating accuracy profiles for users for dynamic query resolution. This may be accomplished by referencing search engine session data of a user. The search engine session data includes a plurality of search queries each having an entered-attribute and a resolved-attribute. A variation between the entered-attribute and the resolved-attribute, for each of the plurality of search queries, is determined based on analyzing the entered-attribute and the resolved-attribute. The entered-attribute is an input of the user and the resolved-attribute is a resolved-input for executing the search query. An input-precision score is generated for an accuracy profile for the user based on the variation between the entered-attribute and the resolved-attribute, for each of the plurality of search queries.

BRIEF DESCRIPTION OF THE DRAWINGS

The present invention is described in detail below with reference to the attached drawing figures, wherein.

DETAILED DESCRIPTION

Figure 1:
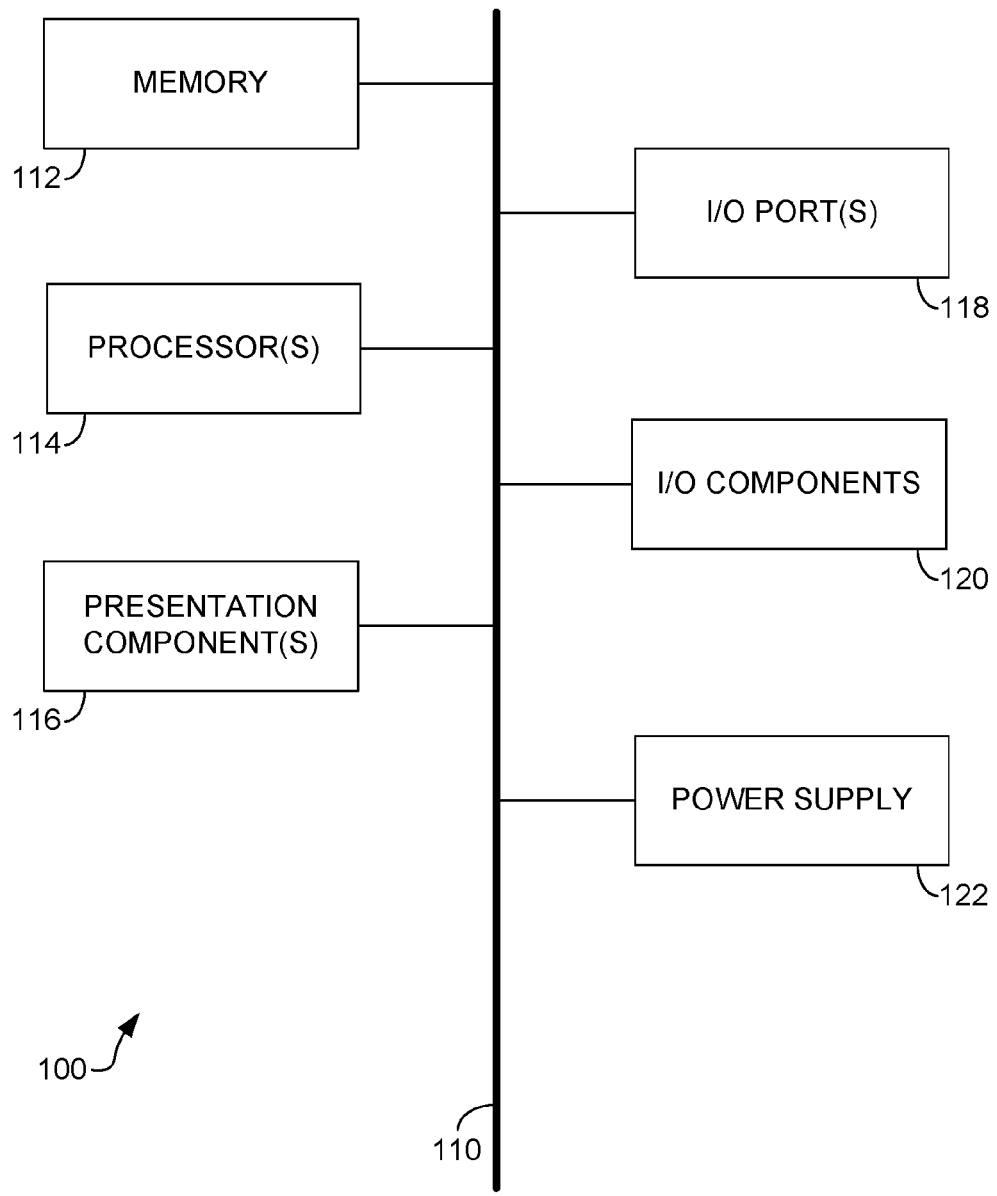
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to search queries entered in a search engine to identify relevant resources. Further, while embodiments of the present invention may generally refer to search engines and the components described herein, it is understood that the techniques described may be extended to other implementations contexts.

Users utilize various types of search engines for identifying relevant resources for search queries. Search engines receive search queries as user input and make meaning of the user input to provide relevant resources. However, user input-precision of search queries varies from user to user. In other words, users make different types of mistakes when entering search queries for relevant resources (e.g., search results). In addition, the input-precision of a user may also be handicapped by the hardware and/or software input system used. To illustrate, by way of example, a first user may have a low input-precision and a second user may have a high input-precision. Input-precision may generally refer to the ability of a user to enter, as input, information that correctly and/or adequately reflects the intent of the user. The first user enters a search query with a specific intent but misspells the search query; the first user then receives a query suggestion for the search query or search results for an auto-corrected variation of the search query. The second user also enters a search query with a specific intent and does not misspell the search query; however, if the search query has a potential misspelling that resolves to a far more popular search query, the second user too may also receive a query suggestion or search results for an auto-corrected variation of the search query. In this regard, an auto-correct, or auto-suggest feature (e.g., a search engine query processor feature) may predict the user's intent without taking into account the specific input-precision characteristics of the user. As such, search engines today fail to account for user input-precision in providing search functionality to different types of users.

Embodiments of the present invention provide systems and methods for factoring specific user input-precision into search query processing. In particular, an accuracy profile for a user may be utilized to improve the performance of search query processing. The accuracy profile may generally refer to a contextual ranking of the ability of a user to enter and/or communicate their intent in a search query. An accuracy profile may be generated from a user's historical interactions with entering input, or in particular from search engine session data of the user (e.g., user misspellings in entering search queries). The accuracy profile may be used with a search engine query processor feature to augment conventional search query processing. Search query processing may generally refer to search engine features that determine the relative importance of 'what a user entered' vs. 'what the search engine thinks the user meant'. Such search engine features may provide functionality ranging from query suggestions and spell checks to alterations and auto-corrections. For example, a user enters a search query but an auto-suggest feature suggests another search query which the user eventually executes the search query on instead of the originally entered query. Embodiments of the present invention may identify and quantify failed past interactions (e.g., input-imprecision traits) of a user into an accuracy profile and provide the accuracy profile to search engine query processor features to resolve an entered search query to resolved query.

Generally, an accuracy profile refers to a multivariate profile having input-imprecision traits of a user. Individual input-imprecision traits may be identified for a user and added to the accuracy profile of the user. The accuracy profile may also be associated with an input-precision score, a probabilistic score indicating the likelihood of an accurate input from a specific user, determined based on a learned knowledge of the specific user's ability to accurately enter data. For example, a low input-precision score may be based on frequent misspellings by a user of search queries entered, while a high input-precision score may be based on infrequent misspellings entered by a user. An input-precision score may be used along with a machine-learned system to understand the intent of a search query of a user; especially in cases where a search engine via a query processor feature makes the final determination that the search query is actually a misspelling of a different query. The input-precision score may be an independently utilized factor, but the multiple factors in the accuracy profile may be used in determining a resolved search query for a user's entered search query. As such, it is contemplated that an accuracy profile may refer to more than just the input-precision score but may also comprise specific systematic traits that are identified in the user's input, such as, misspellings that are common to the specific user or traits associated with input-interfaces of the user.

Accordingly, embodiments of the present invention may further specifically factor, into search query processing, the input-precision of a user as a function of the input-interface (e.g., text-input-interface) used. In particular, a factor for determining the learned input-precision score may be the physical interface (e.g., text-input-interface) employed by the user. An input-interface may generally refer to the point of interaction for directly or indirectly entering a search query. The input-interface may include hardware and/or software components. By way of example, a text-input-interface may be a keyboard or an on-screen soft keyboard. The configuration of a hardware and/or software component may refer to deliberate or unintentional arrangement of the hardware and/or software component that affects its functionality. For example, text-input-interfaces may each be configured differently, such as, keyboards having a variety of different layouts. The layout of specific physical or on-screen keyboards may cause the user to provide inaccurate input with certain well-defined characteristics. A user having a keyboard with a different regional layout (for example the 'AZERTY' keyboard used in France, compared to the 'QWERTY' keyboard used in many English-speaking countries) may substitute certain letters because they are not familiar with the altered layout. Similarly, a specific computer keyboard with a physical defect such as one or more 'sticky' or 'heavy' keys may cause the user to transpose certain letter combinations because of the lag between the sticky key being pressed by the user, and it being registered as a key press by the system.

Further, when the text-input-interface is specifically an on-screen soft keyboard, a variety of different sizes, manufacturers, and add-on software for further customizing the text-input-interfaces may be available. The combination of specific characteristics of the active on-screen keyboard, and the user's ability to use that keyboard effectively, may generate a number of systematic input errors that the user is likely to make. By way of example, a user typing with their thumb on a hand-held smartphone device may find that they are unable to comfortably reach certain keys and are likely to accidentally press a closer key. Generally, auxiliary information such as the particular device and/or mode of input may also be factors in the accuracy profile. For example, a mobile device, laptop, or desktop or keyboard numbers, and num-pad numbers each may provide a different type of interaction as an input-interface that generates different types of input-imprecision traits. The input-imprecision traits may be captured in a user's profile and associated with the specific device and/or mode of input to provide more sophistication to the accuracy profile and as such the resolved search queries generated.

It is further contemplated within embodiments of the present invention that accounting for input-precision in search queries may be incorporate alternative-input interfaces such as voice, stylus (handwriting), and gesturing. In these cases, a machine-learned system for understanding a user's intent may define an accuracy profile based on that user's idiosyncrasies. By way of example, voice input with regional dialects and specific personal affectations, many of which may wholly change how the input is understood. For example, in the English language, a 't' sound in a word may frequently be replaced with a glottal stop by some people, which causes it to sound very different. For a system whose task is to understand speech input, an accuracy profile may capture the tendency to vocalize a glottal stop, so that the correct meaning may be derived from the speech. Stylus input similarly lends itself to many user distinctive traits that characterize their writing style. For example, whether they cross their '7' digits or not, or whether they tend to write with joined script rather than separate letters.

As mentioned, identifying input-imprecision traits of a user in an accuracy profile and providing the accuracy profile to search engine query processor features may help resolve an entered search query to a resolved search query. The search engine query processor feature may use the accuracy profile to enhance functionality that is currently provided. For example, the accuracy profile may be a factor in an algorithm that helps determine one of many auto-suggest prediction options for a user, or automatically executing the entered search query with a resolved search query. Prediction options may be ranked based on the accuracy profile and in particular specific input-imprecision traits of the user. It is contemplated that the accuracy profile may also be implemented as a sliding scale with varying levels of accuracy of a user (e.g., accuracy thresholds and/or accuracy groups) determining what the user interaction with a search engine query processor feature may be. For example, a user with a high input-precision score may be allowed certain presumptions in search query processing that another user with a low input-precision score is not. It is contemplated that user interface elements may be presented to allow for user interaction with search engine query processor features.

Accordingly, in a first aspect of the present invention, one or more computer-readable media storing computer-useable instructions that, when used by one or more computing devices, cause the one or more computing devices to perform a method for generating accuracy profiles for users, for dynamic search query resolution. The method includes referencing search engine session data of a user. The search engine session data includes a plurality of search queries each having an entered-attribute and a resolved-attribute. The method also includes determining a variation between the entered-attribute and the resolved-attribute, for each of the plurality of search queries, based on analyzing the entered-attribute and the resolved-attribute. The entered-attribute is an input of the user and the resolved-attribute is a resolved-input for executing the search query. The method also includes generating an input-precision score for the user based on the variation between the entered-attribute and the resolved-attribute, for each of the plurality of search queries.

In a second aspect of the present invention, one or more computer-readable media storing computer-useable instructions that, when used by one or more computing devices, cause the one or more computing devices to perform a method for dynamic search query resolution based on accuracy profiles of users. The method includes receiving a search query from a user. The method also includes referencing an accuracy profile of the user. The accuracy profile is a multivariate profile having one or more input-imprecision traits of the user, the accuracy profile is associated with an input-precision score. The method further includes determining a resolved-attribute of the search query for an entered-attribute of the search query based on the accuracy profile of the user. The entered-attribute is an input of the user and the resolved-attribute is a resolved-input for executing the search query. The method includes providing the search query with the resolved-attribute as an option for executing the search query.

In a third aspect of the present invention, a system for dynamic search query resolution based on accuracy profiles is provided. The system includes an accuracy profile component configured for: referencing search engine session data of a user. The search engine session data includes a plurality of search queries each having an entered-attribute and a resolved-attribute. The accuracy profile component is further configured for: determining a variation between the entered-attribute and the resolved-attribute, for each of the plurality of search queries, based on analyzing the entered-attribute and the resolved-attribute. The entered-attribute is an input of the user and the resolved-attribute is a resolved-input for executing the search query. The accuracy profile component is also configured for: generating an accuracy profile for the user. The accuracy profile is a multivariate profile having one or more input-imprecision traits of the user, the accuracy profile is associated with an input-precision score based on the variation between the entered-attribute and the resolved-attribute, for each of the plurality of search queries. The system also includes a query execution component configured for: referencing the accuracy profile of the user. The query execution component is also configured for: determining the resolved-attribute of the search query for the entered-attribute of the search query based on the accuracy profile of the user. The resolved-attribute is based on altering the entered-attribute based on information generated at a search engine query processor. The search engine query processor analyzes the accuracy profile of the user. The query execution component is further configured for: executing the search query with the resolved-attribute.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
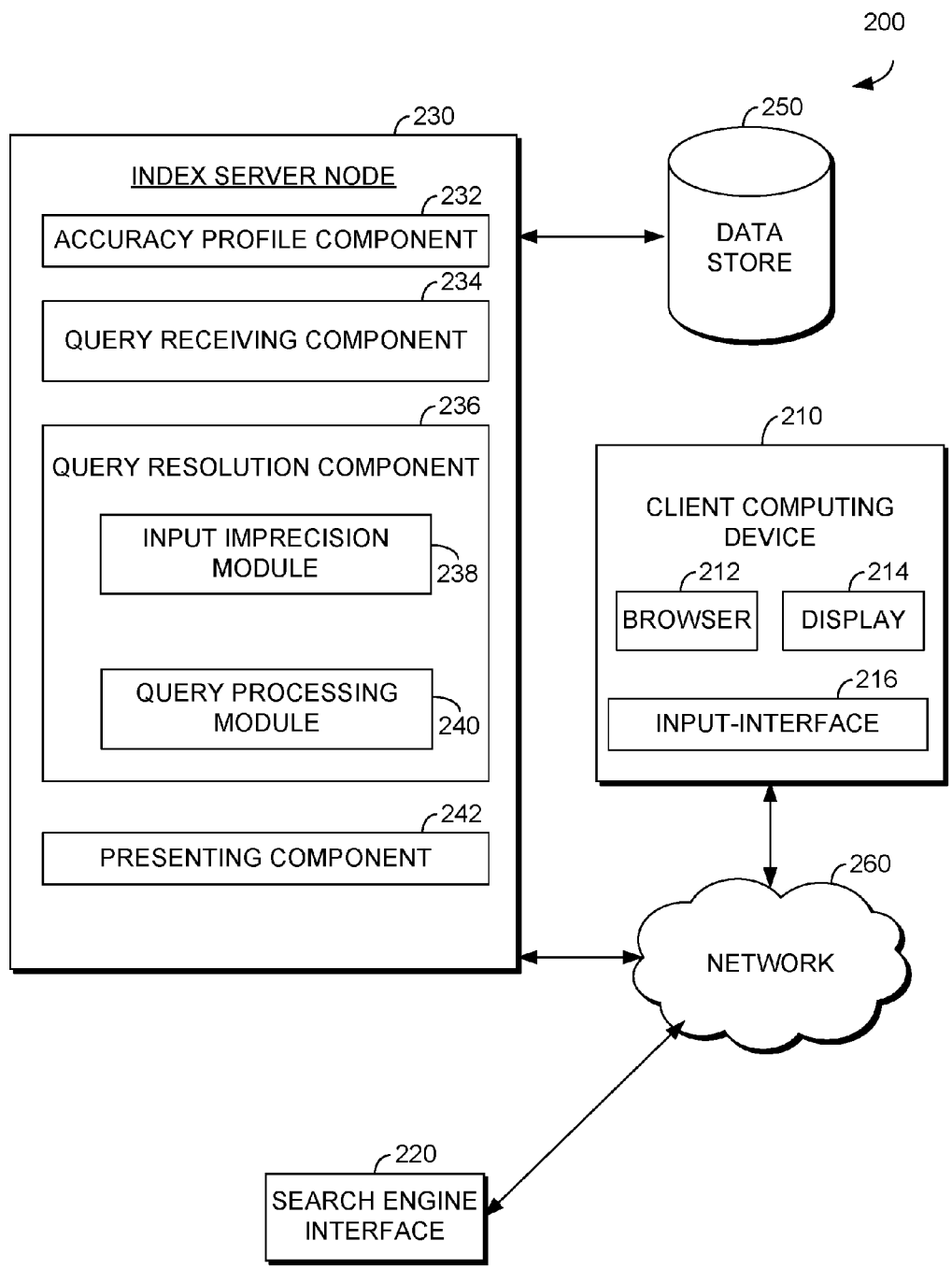
FIG. 2 is a block diagram of an exemplary network environment in which embodiments of the invention may be employed.

With additional reference to FIG. 2, a block diagram depicting an exemplary computing system 200 suitable for use in embodiments of the invention described. Generally, the computing system illustrates an environment in which an accuracy profile may be generated for dynamic search query resolution. Embodiments of the present invention may also provide systems and methods for dynamic search query resolution based on accuracy profiles of users. Among other components not shown, the computing system 200 generally includes a client computing device 210, a search engine interface 220, an index server 230 and a data store 250, all in communication with one another via a network 260. The network 260 may include, without limitation, one or more local area networks (LANs) and/or wide area networks (WANs). Such networking environments are commonplace in offices, enterprise-wide computer networks, intranets and the Internet. Accordingly, the network 260 is not further described herein.

In some embodiments, one or more of the illustrated components/modules may be implemented as stand-alone applications. In other embodiments, one or more of the illustrated components/modules may be implemented with the index server node 230, as an Internet-based service. Any number of client computing devices, search engine interfaces, index server nodes and search engine interface components may be employed in the computing system 200 within the scope of embodiments of the present invention. Each may comprise a single device/interface or multiple devices/interfaces cooperating in a distributed environment. For instance, the index server node 230 may comprise multiple devices and/or modules arranged in a distributed environment that collectively provide the functionality of the index server node 230 described herein. Additionally, other components/modules not shown also may be included within the computing system 200.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 2, the client computing device 210 may include any type of computing device, such as the computing device 100 described with reference to FIG. 1, for example. Generally, the client computing device 210 includes a browser 212, a display 214, and an input-interface 216. The browser 212, among other things, is configured to render search engine home pages (or other online landing pages), and render search engine results pages (SERPs) in association with the display 214 of the client computing device 210. The browser 212 is further configured to receive user input of requests for various web pages (including search engine home pages), receive user input search queries (generally input via a user interface presented on the display 214 and permitting alpha-numeric and/or textual input into a designated search box) and to receive content for presentation on the display 214, for instance, from the index server node 230. It should be noted that the functionality described herein as being performed by the browser 212 may be performed by any other application capable of rendering content items. Any and all such variations, and any combination thereof, are contemplated to be within the scope of embodiments of the present invention.

The client computing device 210 may be associated with an input-interface 216 that provides the point of interaction for directly or indirectly entering a particular type of input. The input-interface 216 may be a hardware and/or software interface, internal to or external of the client computing device 210. For example, a physical keyboard or an on-screen keyboard. The input-interface may include a text-input-interface or an alternative-input-interface (e.g., voice, touchscreen, stylus, or gesture device). It is contemplated that alternative-input-interface may also transmit information in in text format. When a user inputs a search query using the input-interface 216, the input-precision of the input may be captured. The captured input-precision may be analyzed to algorithmically generate an input-precision score. The configuration of the input-interface, for example, a deliberate or unintentional arrangement of the input-interface that affects its functionality, may create specific systematic traits of input entries by the user that are identified in an accuracy profile of the user. The input-interface may be associated auxiliary information such as a particular mode of input (e.g., physical keyboard/on-screen keyboard) and/or type of device (e.g., mobile device, laptop, or desktop) that may be part of the accuracy profile and associated with particular input-imprecision traits in the accuracy profile.

The index server node 230 of FIG. 2 is generally configured to receive search queries; identify documents relevant to the search query, and present the relevant documents that satisfy the search queries. As illustrated, the index server node 230 includes an accuracy profile component 232, a query receiving component 234, a query resolution component 236 having an input imprecision module 238 and a query processing module 240, and a presenting component 242. The illustrated index server node 230 also has access to a data store 250. The data store 250 is configured to be searchable for one or more of the documents stored in association therewith. It will be understood and appreciated by those of ordinary skill in the art that the information stored in association with the data store 250 may be configurable and may include any information relevant to, among other things, search engine session data for users and accuracy profiles. The content and volume of such information are not intended to limit the scope of embodiments of the present invention in any way. An embodiment of the present invention may include a plurality of index server nodes each associated with its own data store, where a search query is processed at the index server node for the portion of the relevant documents within the data store of the index server node. Further, though illustrated as a single, independent component, the data store 250 may, in fact, be a plurality of storage devices, for instance a database cluster, portions of which may reside in association with the index server node 230, the client computing device 210, another external computing device (not shown), and/or any combination thereof.

The data store 250 may, in particular, store historical user interactions with the search engine (e.g., search engine session data). The accuracy profile component 232 may use search engine session data to identify search queries that are used to create the accuracy profile. The session data may also be used to determine an input-precision score. The input-precision score may be algorithmically generated based on quantifying the variations between entered search queries and resolved search queries. For instance, counting the frequency of misspellings by a user in entering search queries may help determine an input-precision score. The accuracy profile may also include input-imprecision traits, which generally refer to specific systematic traits that are identified in the user's input. It is contemplated that an input-precision score may be based on a specific type of input-imprecision trait. In addition, input-imprecision traits may be associated with auxiliary information such as a particular device and/or mode of input. As such, the accuracy profile may be a multivariate profile that characterizes all of the historical input errors, in association with auxiliary information, that have been made by that user in their interactions with a search engine. Such information may also be available and/or derived from the search engine session data. So in embodiments, rather than aggregate all of the suspected historical input errors into an input-precision score, the accuracy profile may include classes of input errors made by that user.

Generally, the search engine session data may include information retrieved from a search engine session about the search query. In embodiments, search engine session data may also include auxiliary information such as client computing device including the input-interface used for communicating the search query. In particular, search query information may include search queries that users have submitted to a search engine, how the search queries were resolved and eventually selected (or "clicked") and executed, the search results provided in response to the search queries, and search results users have selected in response to submitted search queries. By way of example only and not limitation, the search engine session data may include search engine log files, query-click graphs, query histograms, search engine toolbar data, web browsing data (e.g., logs of user behavior of users browsing web pages), input-interfaces, device information, etc. Any of a variety of different search engine session data may be employed in accordance with embodiments of the present invention.

Further, search engine session data may be based on specific user interactions with search engine query processors. For example, a search engine query processor may offer users ways to indicate whether suggestions or alterations are appropriate or inappropriate. For example, a "re-query link" with which a user may indicate that a provided suggestion was what the user actually meant to search for, or a "recourse link" with which the user may indicate that their exact original query was more relevant than the provided suggestion. Also, for a user that frequently enters queries for which a speller feature suggests a spell-corrected version, and then the user clicks the spell-corrected version, that may be an indication that a user's typing is imprecise.

Based on such search engine session data, an input-precision score may be determined. It is contemplated that the input-precision may either be continuously refined or periodically refined using available search engine session data. For example, the input-precision score may take into account a predefined period of the search engine session data to determine the input-precision score. The refinements may be used to reinforce certain assumptions or alter assumptions for the specific user. Upon generating the accuracy profile, the accuracy profile may be stored in the data store 250. In embodiments, the accuracy profile may comprise the input-precision score as a simple key-value pair, with the key being the user's unique identifier and the value may be a numeric indication of the input-precision score. In other embodiments the accuracy profile comprises multiple variables with ranges that provide a sophisticated view of the user's input-precision in that they characterize different aspects of the how the user enters data (e.g., misspellings, altered search queries, device types, input modes, keyboard sizes, etc.)

In operation, the input-precision score may be generated using a variety of techniques. For example, every query that the user is known to have entered may be compared with a dictionary of known common spelling mistakes. Comparisons may be done in the user's language in particular, where the user's language can be determined based on user preferences, IP address, browser accept language settings, and various other ways. The dictionary of common spelling mistakes may be created by analyzing query logs to find instances where users re-type a query to correct a spelling mistake, and extract the most commonly-corrected queries from this. Another example may include calculating the percentage of the times that suggestions given by an auto-suggest feature are based on a spell-corrected version of the input query. This may provide a reasonable indication of whether the query is spelled correctly or otherwise. In addition, analysis of the frequency with which the user makes use of the query-refinement tools (such as the "DID YOU MEAN: <spell-corrected-query>" prompt, and the "recourse link" with which the user can indicate that their exact query was more relevant to them than a suggested correction). A combination of the number of clicks on the "DID YOU MEAN" link, the recourse link, and number of clicks on anything else could yield an indication of how frequently the user's exact query was more relevant to them then the spell-corrected one. Any variations or combinations thereof may be employed in accordance with embodiments of the present invention.

Input-interfaces may also help identify input-imprecision traits and generate the input-precision score. For example, text-input-interfaces may each be configured differently, such as, keyboards having a variety of different layouts. The layout of specific physical or on-screen keyboards may cause the user to provide inaccurate input with certain well-defined characteristics. A user having a keyboard with a different regional layout (for example the 'AZERTY' keyboard used in France, compared to the 'QWERTY' keyboard used in many English-speaking countries) may substitute certain letters because they are not familiar with the altered layout. Similarly, a specific computer keyboard with a physical defect such as one or more 'sticky' or 'heavy' keys may cause the user to transpose certain letter combinations because of the lag between the sticky key being pressed by the user, and it being registered as a key press by the system. Again, the above-noted techniques for search engine session query-processor-feature interactions are provided for illustrative purposes only, and embodiments of the present invention may employ any combination of a variety of techniques used to generate the accuracy profile and an associated input-precision score.

The query receiving component 234 of the index server node 230 is configured to receive requests for presentation of relevant documents that satisfy a search query. Typically, such a request is received via the browser 212, search engine interface 220, or combination thereof. The search query may be received via a search interface 220 that provides a search input field. It should be noted, however, that embodiments of the present invention are not limited to users inputting a search query into a traditional query-input region of a screen display. The query receiving component may also function to receive search queries from different types of input interfaces.

The query resolution component is configured to determine a resolved query that is used to execute the query. The query resolution component includes the input imprecision module 238 and the query processing module 240. The input imprecision module 238 may reference an accuracy profile of a user in the data store to facilitate determining whether the search query the user entered is the search query the user meant to enter. The input imprecision module may reference the accuracy profile and provide the input-precision score to the query processing module 240 to determine a resolved query. In embodiments, the input imprecision module may receive the entered search query and compare the entered search query with input imprecision traits in the accuracy profile to determine what variables in the accuracy profile are triggered by attributes in the entered search query. For example, a user has a sticky shift key and instead of entering the '@' symbol in an email address, the user enters the number '2' because of the delay in the shift key being pressed down. As such '2' may be identified as an attribute associated with '@', in which case, the '2' attribute of the search query may be resolved to the '@' attribute. An attribute in this regard may refer to a defined element of a search query, for example, a letter, symbol, word, or phrase in a text query. Similarly, other alternate-input-interfaces may also define attributes based on the how the user interacts with the interface. Different types of attributes may be associated with different types of input-imprecision traits in the accuracy profile of a user. Any and all such variations, and any combination thereof, are contemplated to be within the scope of embodiments of the present invention.

The input imprecision module may also generally act as to receive, determine, and communicate particular auxiliary information relevant to determining a resolved search query for an entered search query. Auxiliary information may include, for instance, the input mode and/or particular device associated with an input imprecision trait. Auxiliary information may also include the input mode and/or particular device used by a user during an active search query session. In this regard, the input mode and/or particular device of an active user may be compared to an input imprecision trait associated with the auxiliary information to generate a resolved query for an entered query of the user. The input-score, input-imprecision traits, and auxiliary information may further be communicated to the query processing module 240 to determine a resolved search query.

The query processing module 240 is generally configured to determine the relative importance of 'what a user entered' vs. 'what the search engine thinks the user meant'. At a basic level, the query processing module functions to determine the user's intent, given that the specific entered search query provided in the search query may have zero or more errors associated with it. Query processing module 240 provides conventional functionality ranging from query suggestions and spell checks to alterations and auto-corrections based at least in part on the accuracy profile comprising input-precision score, input imprecision traits, auxiliary information received from the input imprecision module. The input-precision score may be factored into a behavioral model that determines a resolved search query from an entered search query. It is contemplated that if the query processor module 240 factors an accuracy profile of a first user with a low input-precision score and a second user with a high input-precision score the query processor module 240 may generally be more likely to alter a misspelled query entered by an the first user, and less likely to alter the same query when entered by the second user. The input-precision score may also be one of several hundred or thousand features, which will be combined by a machine learning system to produce an optimal result. As such, rather than a single input-precision score being provided to the behavioral model, a large number of feature values based different types of input errors or classes of errors (e.g., input imprecision traits) that the user is known to make, and the frequencies with which they are known to make each of these types of error.

Figure 3A:
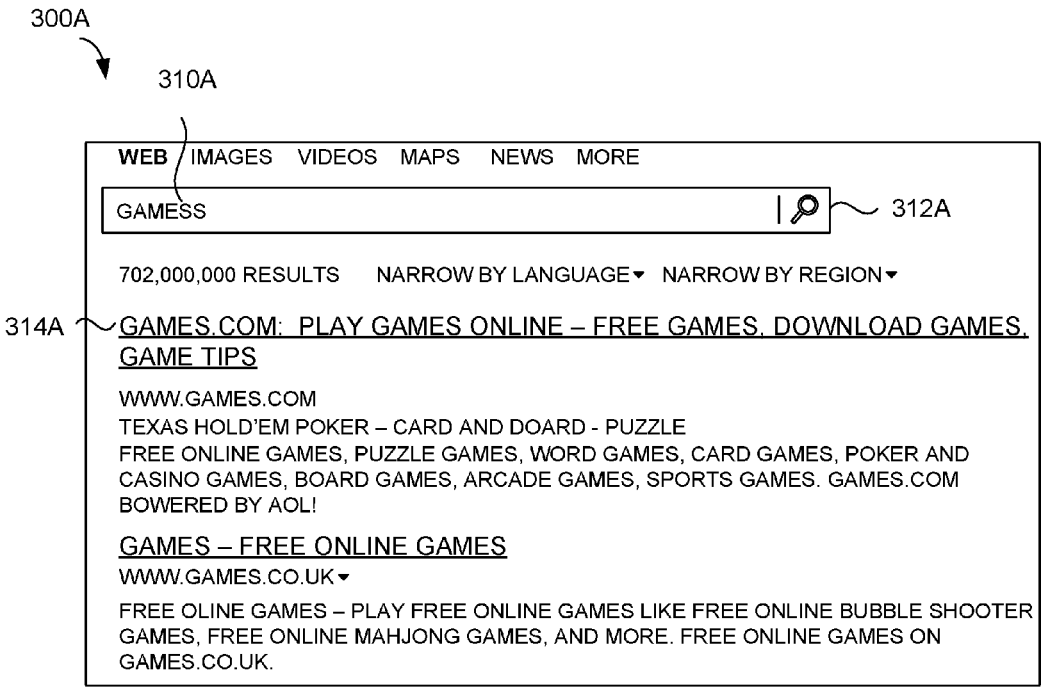
FIGS. 3A-B are schematic diagrams showing exemplary screen displays of a method for dynamic query resolution using accuracy profiles, in accordance with embodiments of the present invention.

In embodiments, the functionality of the query processing module may include interface functionality that is presented to the user for selection and/or providing feedback. Exemplary screen displays showing interface functionality presented in association with embodiments of the present invention are more fully described below with respect to FIGS. 3-5. With reference to FIG. 3A, a schematic diagram is illustrated showing an exemplary screen display 300A having a misspelled search query "GAMESS" 310A entered into the search input field 312A. The misspelled search query is automatically replaced with its most likely spell-corrected version without any indication to the user, in accordance with an embodiment of the present invention. For instance, the user associated with the entered search query has a very low input-precision score, so the assumption is that the search query is incorrectly spelled as such the search query is automatically executed without interface options. The resolved search query "GAMES" is identified at least in part on the accuracy profile of the user. The display 300 includes algorithmic search results 314A for "GAMES".

Figure 3B:
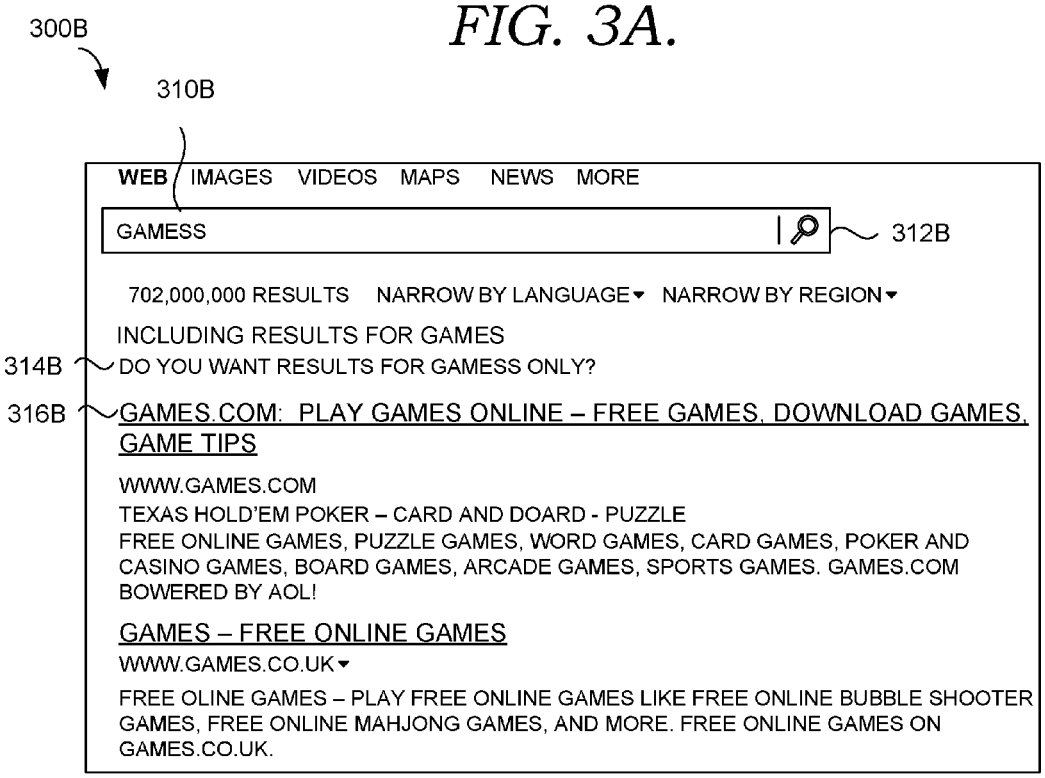

With reference to FIG. 3B, a schematic diagram is illustrated showing an exemplary screen display 300B having a misspelled search query "GAMES S" 310B entered into the search input field 312B. The misspelled search query is automatically replaced with its most likely spell-corrected version with some indication to the user that an alteration has been made, in accordance with an embodiment of the present invention. The resolved search query "GAMES" is identified at least in part based on the accuracy profile of the user; and additional interface functionality e.g., 314B "DO YOU MEAN RESULTS FOR GAMESS?" may be triggered. For instance, the user associated with the search query has a moderate input-precision score that triggers interface elements that communicate search query processing determinations. The display 300B includes algorithmic search results 316B for "GAMES".

Figure 4A:
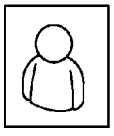
FIGS. 4A-B are schematic diagrams showing exemplary screen displays of a method for dynamic query resolution using accuracy profiles, in accordance with embodiments of the present invention.
Figure 4B:

With reference to FIGS. 4A and 4B, a schematic diagram is illustrated showing an exemplary screen display 400A having an entered search query "MICHAEL LONDON" 410A entered into the search input field 412A. Conventionally, it may be the case that a user provides input that precisely and accurately identifies a very specific and rarely requested result, and that a simple correction to that input would yield a very common result. In these cases, the search results presented to the user might be incorrectly composed entirely of the incorrect search results because the search engine might estimate it to be likely that the user made a mistake in the input. With embodiments of the present invention, the user may be known, for instance, to have a moderate input-precision score or a high input-precision score, which in turn may impact search query processing. By way of example, a user with a moderate input-precision score searching for "MICHAEL LANDON" may receive search results in position 1-414A and position 2-416A for both "MICHAEL LONDON" and "MICHAEL LANDON' respectively because "MICHAEL LANDON" is generally more popular. Compared to FIG. 4B, a schematic diagram is illustrated showing an exemplary screen display 400B having an entered search query "MICHAEL LONDON" 410B entered into the search input field 412B. If the user is associated with a high input-precision, then the result might be ranked to place the result for the un-modified and less popular "MICHAEL LONDON" query first.

Figure 5:
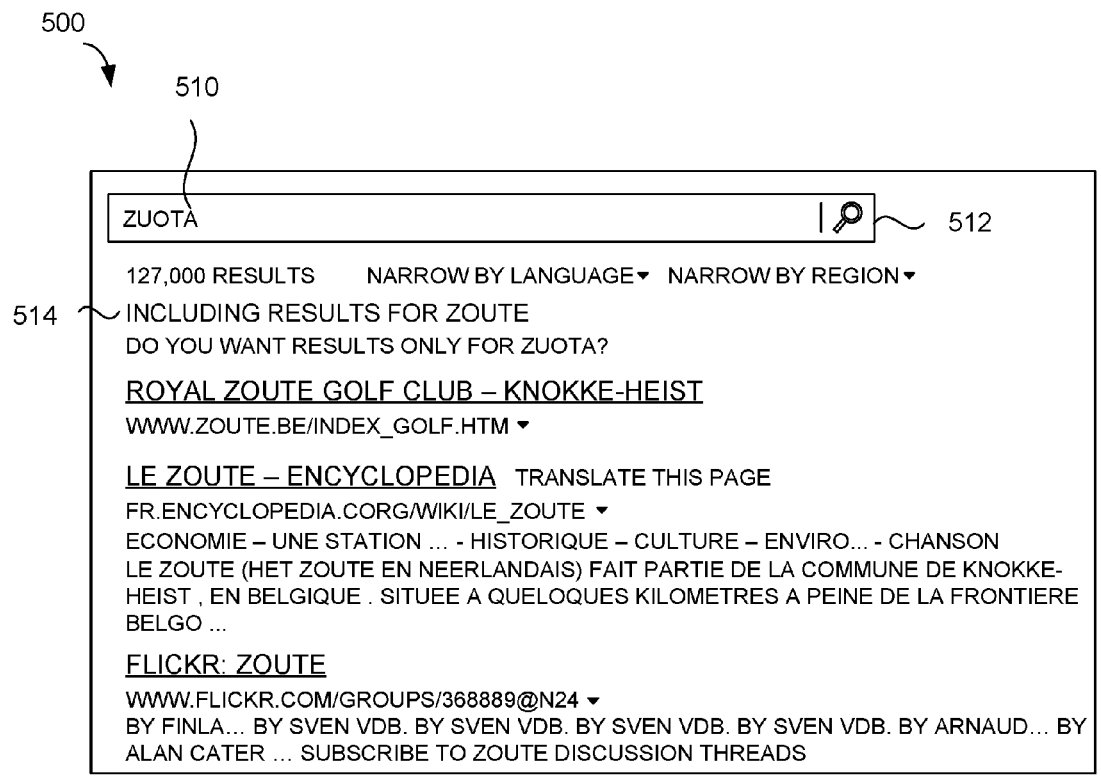
FIG. 5 is a schematic diagram showing exemplary screen displays of a method for dynamic query resolution using accuracy profiles, in accordance with embodiments of the present invention.

With reference to FIG. 5, a schematic diagram is illustrated showing an exemplary screen display 500 having an entered search query "ZUOTA" 510 entered into the search input field 512. In embodiments where the system has built up a rich profile of the user's input characteristics (e.g., input imprecision traits), some specific and targeted corrections to the input data may be possible. For example, if a user is using a French 'AZERTY' keyboard rather than the English 'QWERTY' which may be determined either from the input device's published configuration or from search engine session data, targeted corrections may generated. For the entered query "ZUOTA" 510 the substitution Z=>Q may be selected based on this knowledge, even though it is not generally a common input error, in order to get the results for the intended input 'QUOTA'. Currently, as shown in the figure, the input is altered to 'ZOUTE' yielding some undesired results 514.

Figure 6:
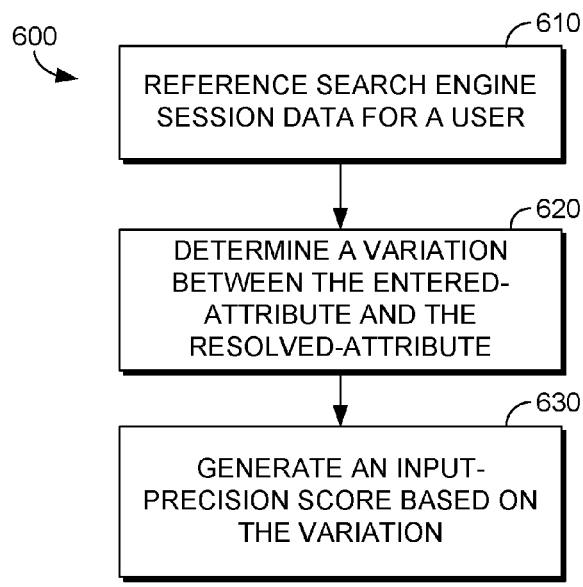
FIG. 6 is a flow diagram showing a method for dynamic query resolution using accuracy profiles, in accordance with embodiments of the present invention.

Turning now to FIG. 6, a flow diagram is provided that illustrates a method 600 for generating accuracy profiles for users, for dynamic search query resolution. At block 610, search engine session data of a user is referenced. The search engine session data includes a plurality of search queries each having an entered-attribute and a resolved-attribute. At block 620, a variation between the entered-attribute and the resolved-attribute, for each of the plurality of search queries, is determined based on analyzing the entered-attribute and the resolved-attribute, wherein the entered-attribute is an input of the user and the resolved-attribute is a resolved-input for executing the search query. At block 630, an input-precision score is generated based on the variation between the entered-attribute and the resolved-attribute, for each of the plurality of search queries.

Figure 7:
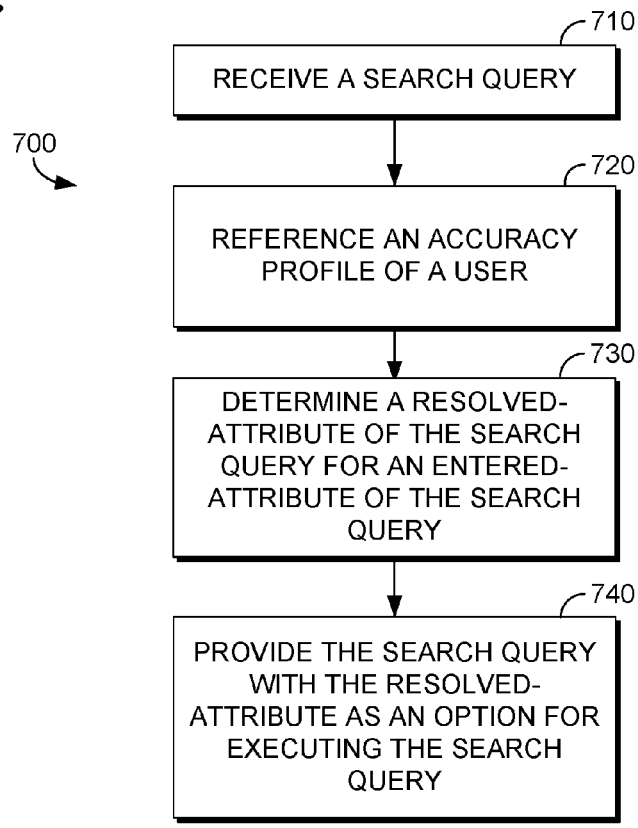
FIG. 7 is a flow diagram showing a method for dynamic query resolution using accuracy profiles, in accordance with embodiments of the present invention.

Turning now to FIG. 7, a flow diagram is provided that illustrates a method 700 for generating accuracy profiles for users, for dynamic search query resolution. At block 710, a search query is received from a user. At block 720, an accuracy profile of the user is referenced. The accuracy profile is a multivariate profile having one or more input-imprecision traits of the user. The accuracy profile is associated with an input-precision score. At block 730, a resolved-attribute of the search query for an entered-attribute of the search query is determined, based on the accuracy profile of the user. The entered-attribute is an input of the user and the resolved-attribute is a resolved-input for executing the search query. At block 740, the search query with the resolved attribute is provided as an option for executing the search query.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A user interface for providing dynamic search query resolution, the interface executed on a hardware processor comprising:
    a search input field to receive a search query from a user; and
    a resolved attribute portion to display a resolved-attribute of the search query for an entered attribute of the search query, wherein the resolved attribute is determined based on referencing an accuracy profile of the user, wherein the accuracy profile is a multivariate profile having one or more input-imprecision traits of the user, wherein the entered-attribute is an input of the user and the resolved attribute is a resolved-input for executing the search query, and wherein the search query with the resolved-attribute is provided as an option for executing the search query.

2. The user interface of claim 1, wherein determining the resolved-attribute is based on altering the entered-attribute based on information generated by a search engine query processor, wherein the search engine query processor provides interface elements based at least in part on the accuracy profile of the user.

3. The user interface of claim 2, wherein the interface elements include an order of presentation of search results.

4. The user interface of claim 2, wherein the interface elements include user feedback queries for further refinement of the entered-attribute.

5. The user interface of claim 2, wherein a feature of the search engine query processor provided via the user interface is selected from one of:
an auto-suggestion feature;
an auto-correct feature; and
a spelling feature.

6. The user interface of claim 1, wherein determining the resolved-attribute of the search query for the entered-attribute of the search query based on the accuracy profile of the user further comprises:
identifying in the search query an input-imprecision trait of the user, the input-imprecision trait is associated with the entered-attribute;
identifying the resolved-attribute based on the input-imprecision trait; and
selecting the resolved-attribute to execute the search query.

7. A system for generating a user interface for dynamic search query resolution based on accuracy profiles of users, the system comprising:
a processor and a memory configured for providing computer program instructions to the processor:
an accuracy profile component configured for:
referencing search engine session data of a user, wherein search engine session data includes a plurality of search queries each having an entered-attribute and a resolved-attribute;
determining a variation between the entered-attribute and the resolved-attribute, for each of the plurality of search queries, based on analyzing the entered-attribute and the resolved-attribute, wherein the entered-attribute is an input of the user and the resolved-attribute is a resolved-input for executing a search query; and
generating an accuracy profile for the user, wherein the accuracy profile is a multivariate profile having one or more input-imprecision traits of the user, the accuracy profile is associated with an input-precision score based on the variation between the entered-attribute and the resolved-attribute of each of the plurality of search queries;
a presenting component configured for presenting:
a search input field to receive the search query from a user; and
a resolved attribute portion to display the resolved-attribute of the search query for the entered attribute of the search query; and
a query execution component configured for:
referencing the accuracy profile of the user;
determining the resolved-attribute of the search query, received via the search input field, for the entered-attribute of the search query based on the accuracy profile of the user,
wherein the resolved-attribute is based on altering the entered-attribute based on information generated at a search engine query processor, wherein the search engine query processor analyzes the accuracy profile of the user; and
executing the search query with the resolved-attribute.

8. The system of claim 7, further comprising
a presenting component configured for:
displaying interface elements using information generated at the search engine query processor, wherein the search engine query processor provides interface elements based at least in part on the accuracy profile of the user,
wherein a feature of the search engine query processor is selected from one of:
an auto-suggestion feature;
an auto-correct feature; and
a spelling feature.

9. The system of claim 7, wherein determining the variation between the entered-attribute and the resolved-attribute, for each of the plurality of search queries, further comprises:
identifying a first plurality of variations based on a change in spelling between the entered-attribute and the resolved-attribute; and
identifying a second plurality of variations based on a search engine query processor feature, wherein the entered-attribute is altered to the resolved-attribute using information generated by the search engine query processor.

10. The system of claim 7, wherein at least one of the one or more input-imprecision traits is based on an input-interface used for the entered-attribute, wherein a configuration of the input-interface systematically generates the entered-attribute that is altered to the resolved-attribute to execute the search query.

11. The system of claim 7, further comprising:
the query execution component configured for:
identifying in the search query an input-imprecision trait of the user, the input-imprecision trait is associated with the entered-attribute;
identifying the resolved-attribute based on the input-imprecision trait; and
selecting the resolved-attribute to execute the search query.

12. A user interface for providing dynamic search query resolution, the interface, executed on a hardware processor, the interface comprising:
a search input field to receive a search query from a user; and
a resolved attribute portion to display a resolved-attribute of the search query for an entered attribute of the search query, wherein the resolved attribute is determined based on an accuracy profile of the user, the accuracy profile is a multivariate profile having one or more input-imprecision traits of the user,
wherein the accuracy profile is generated based on referencing search engine session data of a user, wherein search engine session data includes a plurality of search queries each having an entered-attribute and a resolved-attribute;
determining a variation between the entered-attribute and the resolved-attribute, for each of the plurality of search queries, based on analyzing the entered-attribute and the resolved-attribute, wherein the entered-attribute is an input of the user and the resolved-attribute is a resolved-input for executing the search query; and
generating an input-precision score for the accuracy profile of the user based on the variation between the entered-attribute and the resolved-attribute of each of the plurality of search queries.

13. The user interface of claim 12, wherein determining the variation between the entered-attribute and the resolved-attribute, for each of the plurality of search queries, further comprises identifying a plurality of variations based on a change in spelling between the entered-attribute and the resolved-attribute of each of the plurality of search queries.

14. The user interface of claim 12, wherein determining the variation between the entered-attribute and the resolved-attribute, for each of the plurality of search queries, further comprises identifying a plurality of variations based on a search engine query processor feature, wherein the entered-attribute is altered to the resolved-attribute using information generated by the search engine query processor feature.

15. The user interface of claim 12, further comprising identifying a plurality of input-imprecision traits between the entered-attribute and the resolved-attribute, for each of the plurality of search queries, wherein the plurality of input-imprecision traits are specific systematic traits.

16. The user interface of claim 15, wherein a portion of the plurality of input-imprecision traits are associated with auxiliary information associated with at least one of the plurality of search queries.

17. The user interface of claim 15, wherein the input-precision score is one of a plurality of factors associated with the accuracy profile.

18. The user interface of claim 17, wherein the input-precision score is an algorithmically generated score that represents a likelihood of the variation between the entered-attribute and the resolved-attribute in a subsequent search query of the user.

19. The user interface of claim 15, wherein at least one of the plurality of input-imprecision traits is based on an input-interface used for the entered-attribute, wherein a configuration of the input-interface systematically generates the entered-attribute that is altered to the resolved-attribute to execute the search query.

20. The user interface of claim 19, wherein the input-interface is selected from one of:

a keyboard;

a voice-input;

a stylus; and a gesture device.

* * * * *